United States Patent [19]

Yoshida

[11] 4,318,081
[45] Mar. 2, 1982

[54] OBJECT INSPECTION SYSTEM
[75] Inventor: Hajime Yoshida, Tokyo, Japan
[73] Assignee: Hajime Industries Ltd., Tokyo, Japan
[21] Appl. No.: 105,294
[22] Filed: Dec. 19, 1979
[51] Int. Cl.$^3$ ............................................. G06K 9/32
[52] U.S. Cl. ........................... 340/146.3 H; 358/101; 358/107; 364/468
[58] Field of Search ................. 340/146.3 R, 146.3 F, 340/146.3 H, 146.3 AH; 358/101, 106, 107, 96, 139; 364/468, 490, 491, 515, 560, 561, 516; 356/375, 380, 385, 386, 387, 398

[56] References Cited

U.S. PATENT DOCUMENTS

| | | | |
|---|---|---|---|
| 3,749,830 | 7/1973 | Blitchington | 358/101 |
| 3,903,363 | 9/1975 | Montone et al. | 358/101 |
| 3,908,077 | 9/1975 | Stut et al. | 358/101 |
| 3,947,628 | 3/1976 | Alien et al. | 358/101 |
| 3,980,812 | 9/1976 | Grosskopf et al. | 358/107 |
| 3,997,781 | 12/1976 | Messman | 358/101 |
| 4,045,772 | 8/1977 | Bouton et al. | 358/107 |

Primary Examiner—Leo H. Boudreau
Attorney, Agent, or Firm—Thomas R. Morrison

[57] ABSTRACT

An object recognition or inspection system with special features is disclosed, in which an object to be inspected is photoimaged by a photo image sensing device. While forming a comparative control signal by processing the horizontal as well as vertical synchronizing signals contained in a complex video signal from the photo image sensing device, at the same time by supplying the video signal from the photo image sensing device and the reference signal from a reference signal generator, to a comparator, and by further supplying the comparative control signal to the comparator only during the period as specified by the comparative control signal, the video signal is compared with the reference signal at the comparator and an inspection start signal is generated from the comparator and then such inspection start signal is supplied to the inspection system to start the inspection of the object recognition system.

3 Claims, 11 Drawing Figures

OBJECT INSPECTION SYSTEM

BACKGROUND OF THE INVENTION

1. Field of the Invention

The present invention relates generally to an object inspection systems, and more particularly to a new object inspection system of the type that takes the photo image of an object to be inspected by a photo image sensing device.

2. Description of the Prior Art

Inspection systems for very small objects that are transferred by such means as belt conveyers under the prior art normally conduct inspection by microscopic magnification of the inspected object. When the inspected object is very small, it is difficult to accurately detect whether or not the inspected object is transferred to a predetermined detecting position with high precision. Under the prior art, the arrival of the object to the predetermined detecting position is detected by a photo switch, proximity switch, etc. When the inspected object is very small, there are various points of inconvenience.

In order to overcome such inconveniences object position detection systems are proposed where photo sensors are installed on the monitor screen on which inspected objects are projected. Such systems will be now explained in reference to FIG. 1. In the system under the prior art shown on FIG. 1, 1 is a belt on which an object 2 to be inspected is transferred in the direction indicated by an arrow 3. At a predetermined position in connection with belt 1, a photo image sensing equipment such as a television camera or the like 4 is installed which photo magnifies the inspected object 2. 5 is a monitor screen of the photo image sensing system 4 on which, at a predetermined position, a photo sensor 6 is installed in order to detect the positioning of the inspected object 2. In FIG. 1, the hatched block is an image 7 of the inspected object 2 on the belt 1 that is projected on the black background of monitor screen 5. Object 2 moves on the monitor screen 5 in the direction indicated by an arrow 8 towards sensor 6. When image 7, for instance, overlaps sensor 6, sensor 6 generates a start signal which is supplied to an object inspection or recognition system 9 such as a computer or the like to conduct the specified inspection of the object 2. However, according to the shape and dimensions of the inspected object 2 or the position thereof on belt 1, for instance, when the image 7 of the inspected object 2 as shown on FIG. 1, is in the position shown by broken like block 10 and moves in the arrow direction 8 on monitor screen 5, image 10 does not overlap sensor 6. Therefore, the inspection system 9 does not start its inspection operation and hence inspection of the object 2 is not conducted. This type of problem can occur even though the sensor 6 is installed with due considerations to the scan direction of the television camera 4 and the transfer direction of the inspected object 2.

Further, from the functional standpoint of television camera 4, since the position detection of the inspected object 2 is at intervals of 16.7 miliseconds, the positioning detection shall inevitably vary or scatter within 16.7 miliseconds.

It is further noted that non action may also be caused by trouble in the monitor television receiver, or upon a decrease of brightness thereof. In addition, the monitor television receiver is constantly in motion so that its life may be shortened.

OBJECTS AND SUMMARY OF THE INVENTION

Accordingly, an objective of the present invention is to provide a novel object recognition system, which avoids the above mentioned defects of systems under the prior art.

Another object of the invention is to provide an object recognition system which can positively inspect an object in a short time.

According to an aspect of the present invention, an object inspection system is provided which comprises:

(a) a photo image sensing device picking up an object to be inspected and delivering a complex video signal;

(b) means for separating horizontal and vertical synchronizing signals and a video signal from the complex video signal;

(c) means for producing a comparative control signal based upon the horizontal and vertical synchronizing signals;

(d) means for generating a reference signal;

(e) means for comparing the video signal with the reference signal only within a period determined by the comparative control signal and producing an inspection start signal; and (f) means for inspecting the object when the inspection start signal is supplied thereto. The other objects, features and advantages of the present invention will become apparent from the following description taken in conjunction with the accompanying drawings.

DESCRIPTION OF THE PREFERRED EMBODIMENT

The present invention will hereinafter be explained in reference with FIGS. 2 through 6.

Figure 1:
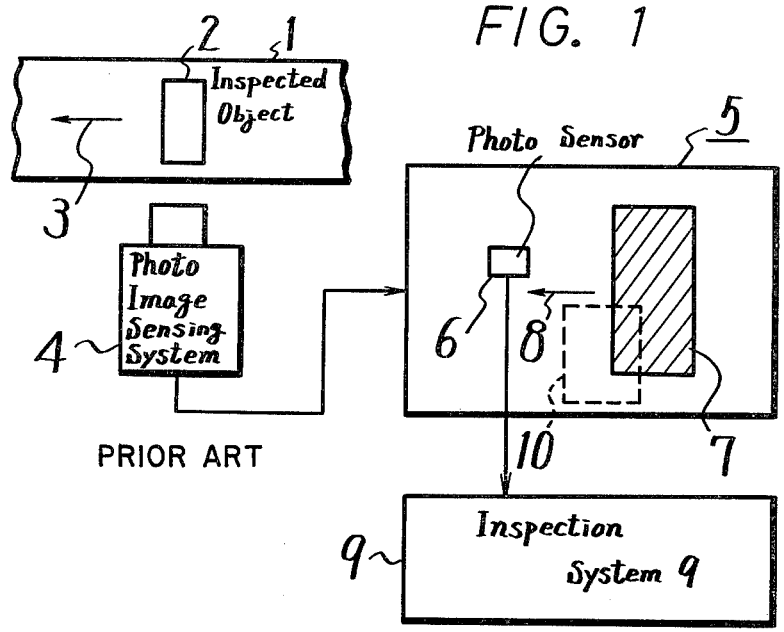
FIG. 1 is a schematic diagram showing an object recognition system under the prior art.
Figure 2:
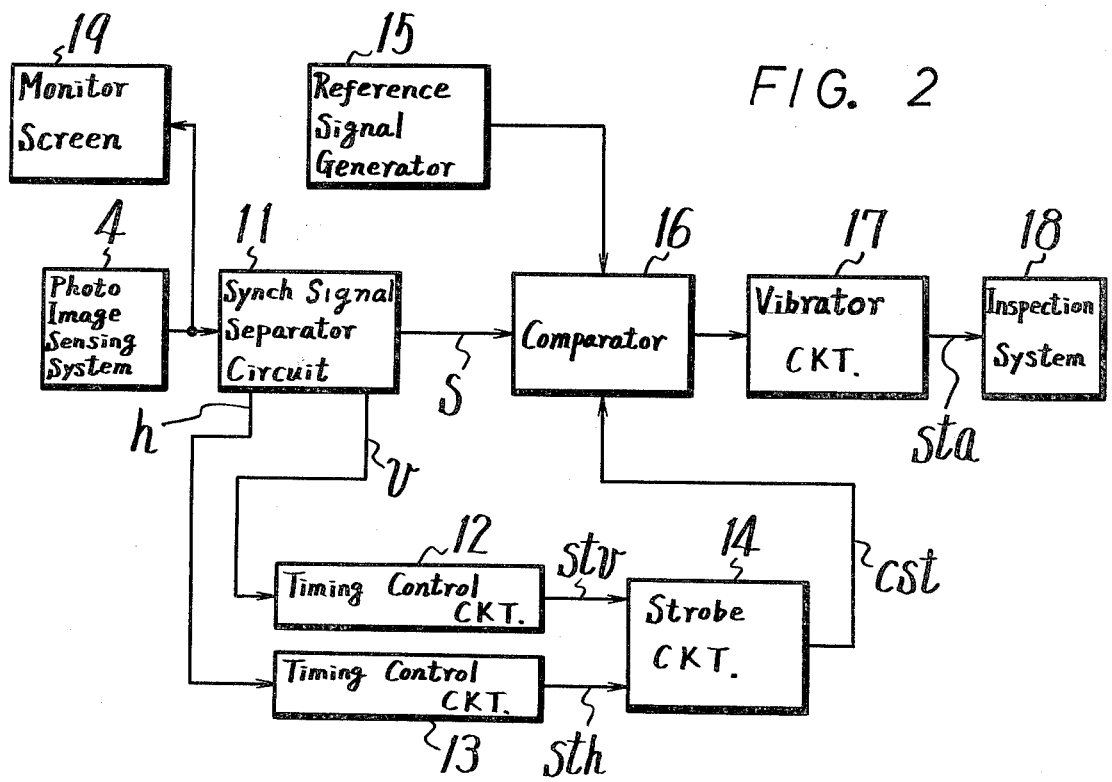
FIG. 2 is a block diagram showing an example of the object recognition system according to the present invention.

FIG. 2 is a block diagram showing an example of the object recognition system according to the present invention. On FIG. 2, 11 designates a synchronizing signal separator circuit, which separates the complex video signal input from the television camera or the like of the photo image sensing system 4 which photographs an object to be inspected (not shown on the FIG. 2), into a horizontal synchronizing signal h, a vertical synchronizing signal v and a video signal s, respectively. The vertical synchronizing signal v that is separated by the synchronizing signal separator circuit 11 is supplied to a timing control circuit 12. A strobe signal stv is produced by the timing control circuit 12 based upon the vertical synchronizing signal v. This strobe signal stv which specifies the vertical position of the detection area on the monitor screen of a monitor television receiver as later explained, is supplied to a strobe circuit 14. The horizontal synchronizing signal h is supplied to a timing control circuit 13. The timing control circuit 13 produces a strobe signal sth based upon the horizontal synchronizing signal h. This strobe signal sth specifies the horizontal position of the detection area on the monitor screen as later described. Stroke signal sth is supplied to the strobe circuit 14. Stroke circuit 14, combines strobe signals stv and sth respectively to produce a composite strobe signal or a comparative control signal cst which specifies the horizontal as well as the vertical position of the detection area on the monitor screen. Comparative control signal cst is supplied to a comparator 16. At the time defined by the composite strobe signal cst, in other words, only at the specified position on the monitor screen, the video signal s is compared with a reference signal which is representative of the brightness level on the monitor screen provided from a level control or reference signal generator 15. The output of comparator 16 is supplied to a monostable multivibrator circuit 17 which includes a retriggerable monostable multivibrator having a time width of, for instance, 63 microseconds minimum. In response to an input, the monostable multivibrator circuit 17 generates an inspection start signal sta. Inspection start signal sta is supplied to an inspection system 18 for inspecting the object such as a computer as well known, although it is not shown on FIG. 2, inspection of the object is conducted. This inspection of the object can be monitored on a monitor screen 19 of a monitor television receiver which receives the output video signal from the television camera 4.

According to the above described construction of the object recognition or inspection system according to the present invention, the following inspection of the object is carried out. If, it is assumed that the monitor screen 19 has a black background, for instance, and an object 21 to be inspected is white as shown on FIG. 3A, when an object 21 to be inspected arrives at a detection area 20 whose position is specified on the monitor screen 19 by the comparative control signal cst, the comparator 16 outputs a compared output by which the monostable multivibrator circuit 17 generates the start signal sta, and the inspection of the object 21 to be inspected is conducted by the inspection system 18.

Figure 3A:
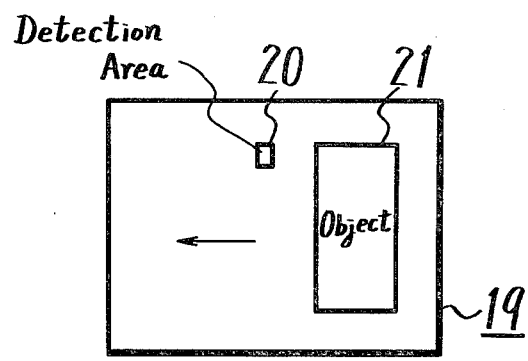
FIGS. 3A, 3B and 3C are schematic diagrams used to explain the present invention.
Figures 4A, 4B:
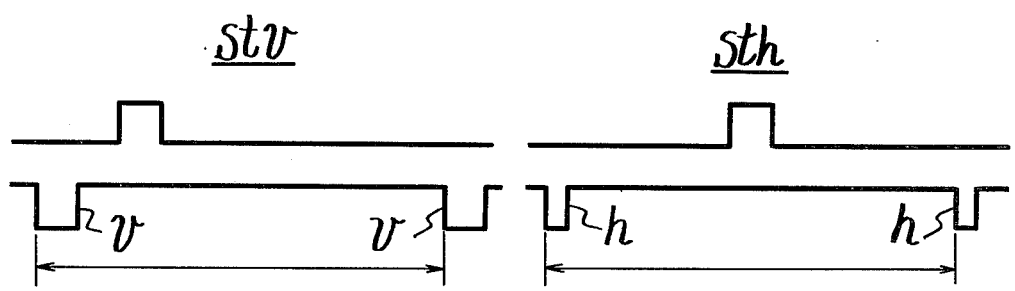
FIGS. 4A and 4B, FIGS. 5A and 5B and FIGS. 6A and 6B are waveform diagrams used to explain the present invention.

Further, in order to establish the detection area 20 as indicated on FIG. 3A, it is sufficient that the timing control circuit 12 so functions that the output signal stv from the timing control circuit 12 by the vertical synchronizing signal v shall be arranged as indicated on FIG. 4A and the timing control circuit 13 so functions that the output signal sth from the timing control circuit 13 by the horizontal synchronizing signal h shall be arranged as indicated on FIG. 4B. By the present invention as above described, it is not necessary to provide a special photo optical sensor on the monitor screen 19 as in the case with the prior art, and since the detection area 20 is specified as a free determination based upon the horizontal as well as vertical synchronizing signals h and v from the photo image sensing system, the monitor television receiver is not directly necessary for the detection action. However, the monitor is only necessary in order to confirm the position of the object to be inspected and so on at the inspection starting time. Accordingly, inspection can not only be conducted without such influence of the monitor screen becoming difficult to observe, or the brightness drop of the monitor screen, or further monitor trouble, but since it does not have to be constantly operated, the life of the monitor television receiver can be preserved for longer periods. In other words, the conventional defects as above mentioned can be almost entirely avoided by this invention.

Figure 3B:
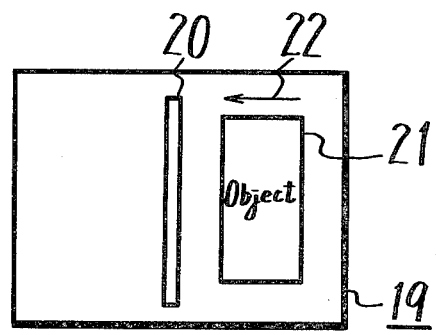

Further, as shown on FIG. 3B as an example, when the object 21 moves in the direction indicated by an arrow 22 to the left on the monitor screen 19, as indicated on the drawing, by setting the detection area 20 narrow and long in the vertical direction on the monitor screen 19, the object 21 can be surely detected in spite of its position being high or low, and the blank period for detection can be greatly reduced.

Figures 5A, 5B:
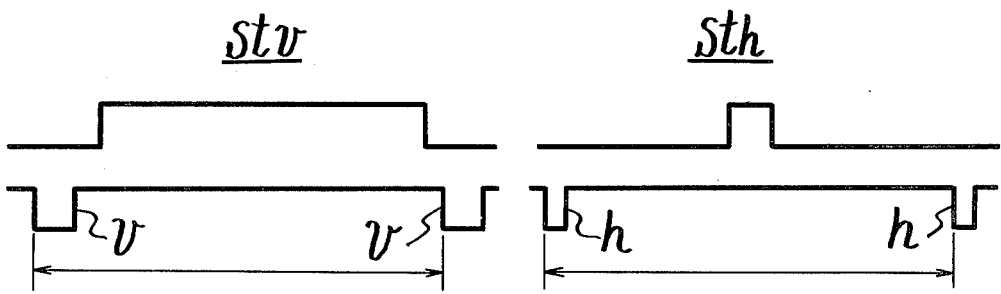
Figures 6A, 6B:
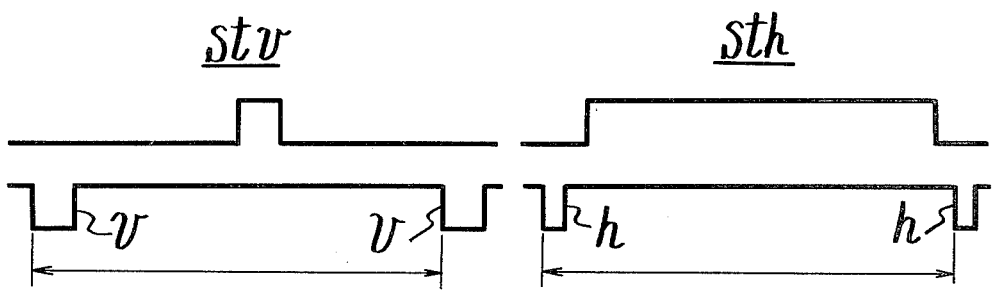

In order to establish the detection area 20 as illustrated on FIG. 3B, the timing control circuit 12 so functions such that the output signal stv from the timing control circuit 12 by the vertical synchronizing signal v shall be as shown on FIG. 5A, and the timing control circuit 13 functions such that the output signal sth from the timing control circuit 13 produced by the horizontal synchronizing signal h shall be established as per FIG. 5B. Thus a short horizontal segment of a large number of vertical lines are defined by the signal cst.

Figure 3C:
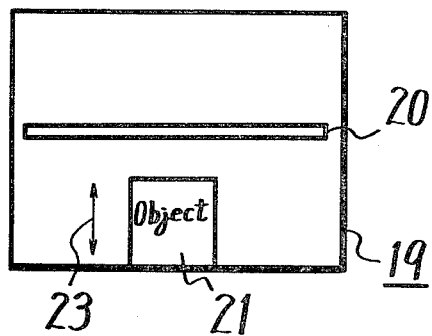

Also as illustrated on FIG. 3C, when the object 21 moves vertically up and down on the monitor screen 19 as indicated by an arrow 23, by establishing the detection area 20 narrow and long in horizontal direction on monitor screen 19 as shown on the drawing, the object 21 can be surely detected in spite of it being mispositioned to the right or left. In order to establish the detection area 20 as shown on FIG. 3C, the timing control circuit 12 functions such that the output signal stv from the timing control circuit 12 produced by the vertical synchronizing signal is as shown on FIG. 6A and the timing control circuit 13 functions such that the output signal sth from the timing control circuit 13 produced by the horizontal synchronizing signal h is as shown on FIG. 6B. Thus long horizontal segments of a few vertical lines are defined by the signal cst.

It is further noted that only a single preferred example of the present invention has been explained in reference to the furnished drawings, but without losing the spirit of the present invention, may variations and changes are obviously possible by any one skilled in the art.

I claim as my invention:

1. An object inspection system comprising:
   (a) a photo image sensing device picking up an object to be inspected and delivering a complex video signal having at least a horizontal synchronizing signal, a vertical synchronizing signal and a video signal;
   (b) means for separating said horizontal and vertical synchronizing signals and said video signal from said complex video signal;
   (c) means for producing a comparative control signal based upon the horizontal and vertical synchronizing signals;
   (d) means for generating a reference signal which is responsive to a characteristic of said video signal;
   (e) means for comparing the video signal with the reference signal only within a period determined by the comparative control signal and for producing an inspection start signal; and
   (f) means for inspecting said object when the inspection start signal is supplied thereto.

2. An object inspection or recognition system as claimed in claim 1, wherein said means for producing the comparative control signal include two timing control circuits which receive the horizontal and vertical synchronizing signals and produce strobe signals, respectively, and a strobe circuit which receives the strobe signals and then produces the comparative control signal.

3. An object inspection system for inspecting an object comprising:

means for producing a complex video signal of said object and its background, said complex video signal including at least a horizontal and a vertical synchronizing signal and a video signal;

means responsive to said horizontal and vertical synchronizing signals to produce a comparison start signal;

means responsive to said background for producing a reference signal;

means for comparing said video signal and said reference signal in response to said comparison start signal to detect a presence of said object in said video signal, operative to produce an inspection start signal in response to said comparison; and means for inspecting said object in response to said inspection start signal.

* * * * *